United States Patent
Harada et al.

(10) Patent No.: US 9,845,011 B2
(45) Date of Patent: Dec. 19, 2017

(54) AUXILIARY POWER SOURCE DEVICE FOR VEHICLE

(75) Inventors: Ryotaro Harada, Tokyo (JP); Takeshi Tanaka, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 342 days.

(21) Appl. No.: 14/355,863

(22) PCT Filed: Nov. 24, 2011

(86) PCT No.: PCT/JP2011/077086
§ 371 (c)(1),
(2), (4) Date: May 2, 2014

(87) PCT Pub. No.: WO2013/076852
PCT Pub. Date: May 30, 2013

(65) Prior Publication Data
US 2014/0327302 A1 Nov. 6, 2014

(51) Int. Cl.
B60L 1/00 (2006.01)
B60L 9/28 (2006.01)
(Continued)

(52) U.S. Cl.
CPC  *B60L 1/00* (2013.01); *B60L 3/00* (2013.01); *B60L 3/0069* (2013.01); *B60L 9/14* (2013.01);
(Continued)

(58) Field of Classification Search
CPC ............ B60L 1/00; B60L 3/0023; H02M 1/12
(Continued)

(56) References Cited

U.S. PATENT DOCUMENTS 4,847,745 A * 7/1989 Shekhawat ......... H02M 7/5387
363/132
5,670,851 A * 9/1997 Numazaki ............. B60L 3/0023
318/106
(Continued)

FOREIGN PATENT DOCUMENTS

JP  55-103078 A  8/1980
JP  62-165721 U  10/1987
(Continued)

OTHER PUBLICATIONS

Korean Office Action dated Apr. 28, 2015, by the Korean Patent Office in corresponding Korean Patent Application No. 10-2014-7016537 and an English translation thereof. (7 pgs).
(Continued)

*Primary Examiner* — Alfonso Perez Borroto
(74) *Attorney, Agent, or Firm* — Buchanan Ingersoll & Rooney PC

(57) ABSTRACT

An auxiliary power source device for a vehicle is incorporated in an electric vehicle and includes a three-phase inverter that converts an input DC voltage into a desired three-phase AC voltage and applies the three-phase AC voltage to a load. The auxiliary power source device further includes a filter reactor that is connected to respective output terminals of a three-phase inverter, a filter capacitor that is connected in a Y-shape at an end on a load side of the filter reactor and is not grounded at a neutral point, and a three-phase transformer that includes primary windings that are connected in a Y-shape at the end on the load side of the filter reactor and is grounded at a neutral point and secondary windings that are connected in a delta shape.

7 Claims, 5 Drawing Sheets

(51) Int. Cl.
  *B60L 3/00* (2006.01)
  *B60L 9/14* (2006.01)
  *B60L 9/30* (2006.01)
  *B60L 15/32* (2006.01)

(52) U.S. Cl.
  CPC .................. *B60L 9/28* (2013.01); *B60L 9/30* (2013.01); *B60L 15/32* (2013.01); *B60L 2200/26* (2013.01); *B60L 2210/40* (2013.01); *B60L 2240/527* (2013.01); *Y02T 10/7241* (2013.01)

(58) Field of Classification Search
  USPC ........................................................ 307/9.1
  See application file for complete search history.

(56) References Cited

U.S. PATENT DOCUMENTS

| | | | | |
|---|---|---|---|---|
| 6,396,279 | B1 * | 5/2002 | Gruenert | G01R 31/3272 324/418 |
| 7,982,341 | B2 * | 7/2011 | Kinoshita | H02H 9/002 307/115 |
| 2010/0118568 | A1 * | 5/2010 | Helle | H02M 1/12 363/34 |
| 2010/0284205 | A1 * | 11/2010 | Noda | H01F 30/04 363/71 |

FOREIGN PATENT DOCUMENTS

| | | |
|---|---|---|
| JP | 64-074002 A | 3/1989 |
| JP | 3-184315 A | 8/1991 |
| JP | 5-056502 A | 3/1993 |
| JP | 6-276669 A | 9/1994 |
| JP | 8-331750 A | 12/1996 |
| JP | 9-084357 A | 3/1997 |
| JP | 9-201073 A | 7/1997 |
| JP | 2000-092892 A | 3/2000 |
| JP | 2005-033885 A | 2/2005 |
| JP | 2006-020394 A | 1/2006 |
| JP | 2009-089502 A | 4/2009 |
| JP | 4391339 B2 | 12/2009 |

OTHER PUBLICATIONS

International Search Report (PCT/ISA/210) dated Feb. 21, 2012, by the Japanese Patent Office as the International Searching Authority for International Application No. PCT/JP2011/077086.

Written Opinion (PCT/ISA/237) dated Feb. 21, 2012, by the Japanese Patent Office as the International Searching Authority for International Application No. PCT/JP2011/077086.

* cited by examiner

PRIOR ART

AUXILIARY POWER SOURCE DEVICE FOR VEHICLE

FIELD

The present invention relates to an auxiliary power source device for a vehicle that is incorporated in an electric vehicle and supplies desired power to a load incorporated in the electric vehicle.

BACKGROUND

As a conventional auxiliary power source device for a vehicle, for example, in an auxiliary power source device for a vehicle described in Patent Literature 1 mentioned below, there is disclosed a configuration in which a PWM converter is connected to an output terminal of a main transformer that transforms and outputs an alternating current (AC) input from an AC overhead wire, a three-phase inverter is connected to an output terminal of the PWM converter, and a filter circuit for eliminating a harmonic component included in an output voltage of the three-phase inverter is included in an output terminal of the three-phase inverter.

The filter circuit mentioned above is configured to include three AC reactors that are respectively inserted in three-phase output lines connecting the three-phase inverter and a three-phase load such that one end is connected to the output terminal of the three-phase inverter and the other end is connected to the three-phase load, and three filter capacitors that are respectively drawn out from three-phase output lines positioned on the other end side of the respective AC reactors and connected to each other in a Y shape, and a connection point of each of the other ends as a neutral point of the Y-connection is grounded.

CITATION LIST

Patent Literature

Patent Literature 1: Japanese Patent No. 4391339

SUMMARY

Technical Problem

As described in Patent Literature 1, in a three-phase power converter in which any three-phase transformer is not provided in an output stage of a three-phase inverter (hereinafter, unless otherwise specified, "output stage of three-phase inverter" is simply referred to as "output stage"), when a three-phase load is connected thereto as a load, in the filter capacitors, a current corresponding to a current difference between currents of respective phases in the three-phase load (hereinafter, the current is referred to as "unbalanced current") is carried. Therefore, when the three-phase load is assumed as a load, the specifications required for the filter capacitors can be satisfied as long as the maximum value of the unbalanced current is assumed.

Meanwhile, in a case of an auxiliary power source device for a vehicle, there is also a requirement of connection of a single-phase load as well as that of a three-phase load. In this connection, when a single-phase load is connected between respective phases of three-phase output lines (between U and N, V and N, and W and N), if a three-phase neutral point of a filter capacitor is grounded, all the current for the capacity of the single-phase load is flowed in the filter capacitor. That is, when the single-phase load is connected to a load in a configuration of grounding the three-phase neutral point of the filter capacitor, a property that is greater than the current capacity originally required for a filtering function is imposed on the filter capacitor that has a grounding function of an output stage as well as a filtering function. Therefore, problems such as cost increase and size increase of the filter capacitor are incurred.

The present invention has been achieved in view of the above problems, and an object of the present invention is to provide an auxiliary power source device for a vehicle that does not impose, on a filter capacitor having a filtering function, a property that is greater than the current capacity originally required for a filter function.

Solution to Problem

The present invention is directed to an auxiliary power source device for a vehicle that achieves the object. The auxiliary power source device for a vehicle is incorporated in an electric vehicle and includes a three-phase inverter that converts an input DC voltage into a desired three-phase AC voltage and applies the three-phase AC voltage to a load; a filter reactor that is connected to respective output terminals of the three-phase inverter; a filter capacitor that is connected in a Y-shape at an end on a load side of the filter reactor and is not grounded at a neutral point; and a three-phase transformer that includes primary windings that are connected in a Y-shape at the end on the load side of the filter reactor and is grounded at a neutral point and secondary windings that are connected in a delta shape.

Advantageous Effects of Invention

According to the present invention, a property that is greater than the current capacity originally required for a filter function is not imposed on a filter capacitor having a filtering function.

DESCRIPTION OF EMBODIMENTS

Exemplary embodiments of an auxiliary power source device for a vehicle according to the present invention will be explained below in detail with reference to the accompanying drawings. The present invention is not limited to the embodiments.

(Embodiment)

Figure 1:
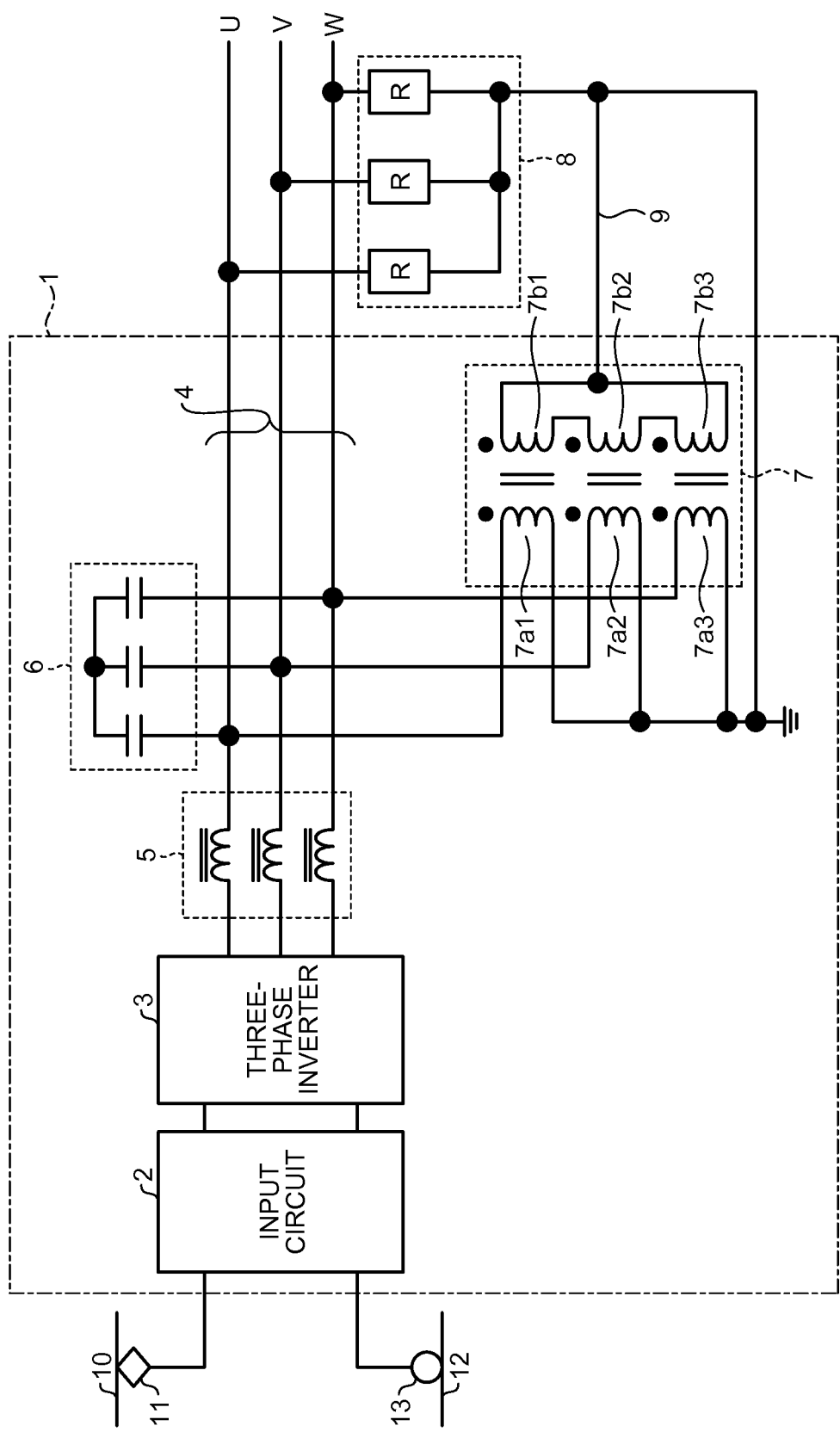
FIG. 1 is a configuration example of an auxiliary power source device for a vehicle according to an embodiment of the present invention.

FIG. 1 is a configuration example of an auxiliary power source device for a vehicle according to an embodiment of the present invention. An auxiliary power source device 1 for a vehicle according to the present embodiment is incorporated in an electric vehicle and it is configured that an output terminal thereof is connectable to a single-phase load 8. As shown in FIG. 1, the auxiliary power source device 1 for a vehicle is configured to include an input circuit 2, a three-phase inverter 3, a filter reactor 5, a filter capacitor 6, and a three-phase transformer 7. Although not shown in FIG. 1, a three-phase load may be connected to the output terminal of the auxiliary power source device 1 for a vehicle.

One end of the input circuit 2 is connected to an overhead wire 10 via a power collector 11 and the other end thereof is connected to a rail 12 via a wheel 13, where the potential of the rail 12 is at the same level as a ground potential. DC power or AC power supplied from the overhead wire 10 is input to one end of the input circuit 2 via the power collector 11, and power (a DC voltage) generated at the output terminal of the input circuit 2 is input (applied) to the three-phase inverter 3.

The three-phase inverter 3 is provided at the output terminal of the input circuit 2, and converts a DC voltage applied from the input circuit 2 into an AC voltage with an arbitrary frequency and an arbitrary voltage and outputs the AC voltage.

The filter reactor 5 is configured to include three reactors that are respectively inserted in three-phase output lines 4 connecting the three-phase inverter 3 and the single-phase load 8, so that one ends are connected to an output terminal of the three-phase inverter 3 and the other ends are connected to the single-phase load 8. The filter capacitor 6 is configured to include three capacitors in which respective ends are connected to each other and the other ends are connected to any one of phases of the three-phase output lines 4 positioned on the other end side (a load side) of the filter reactor 5 so as to be connected in a Y-shape. The filter reactor 5 and the filter capacitor 6 function as filter circuits due to actions of both elements.

The three-phase transformer 7 is configured to include primary windings 7a1 to 7a3 and secondary windings 7b1 to 7b3. Similarly to respective other ends of the filter capacitor 6, respective one ends of the primary windings 7a1 to 7a3 are connected to any one of phases of the three-phase output lines 4 positioned on the other end side of the filter reactor 5, and respective other ends of the primary windings 7a1 to 7a3 are connected to each other so as to be connected in a Y-shape. On the other hand, as for the secondary windings 7b1 to 7b3, adjacent ones of these windings are connected to each other so as to be connected in a delta shape. Accordingly, the three-phase transformer 7 is a three-phase transformer configured in a shape of so-called "Y-delta connection".

Further, in the three-phase transformer 7, the respective other ends of the primary windings 7a1 to 7a3 connected to each other in a Y-shape are grounded at a ground potential. Similarly, a connection terminal (in the example of FIG. 1, a connection terminal between one end of the secondary winding 7b1 and the other end of the secondary winding 7b3) of any of two secondary windings among the secondary windings 7b1 to 7b3 that are connected in a delta shape is also grounded at a ground potential via a connecting wire 9. Note that these secondary windings are grounded so that the potential of these secondary windings is fixed. Accordingly, when the potential of the secondary windings is stable in operation, it is not necessary to ground the secondary windings at a ground potential via the connecting wire 9, and the secondary windings can be in a floating state.

While operations of the auxiliary power source device for a vehicle according to the present embodiment are explained next, operations according to a conventional technique are explained first as a comparison to the fact that the auxiliary power source device for a vehicle according to the present embodiment has remarkable effects.

Figure 2:
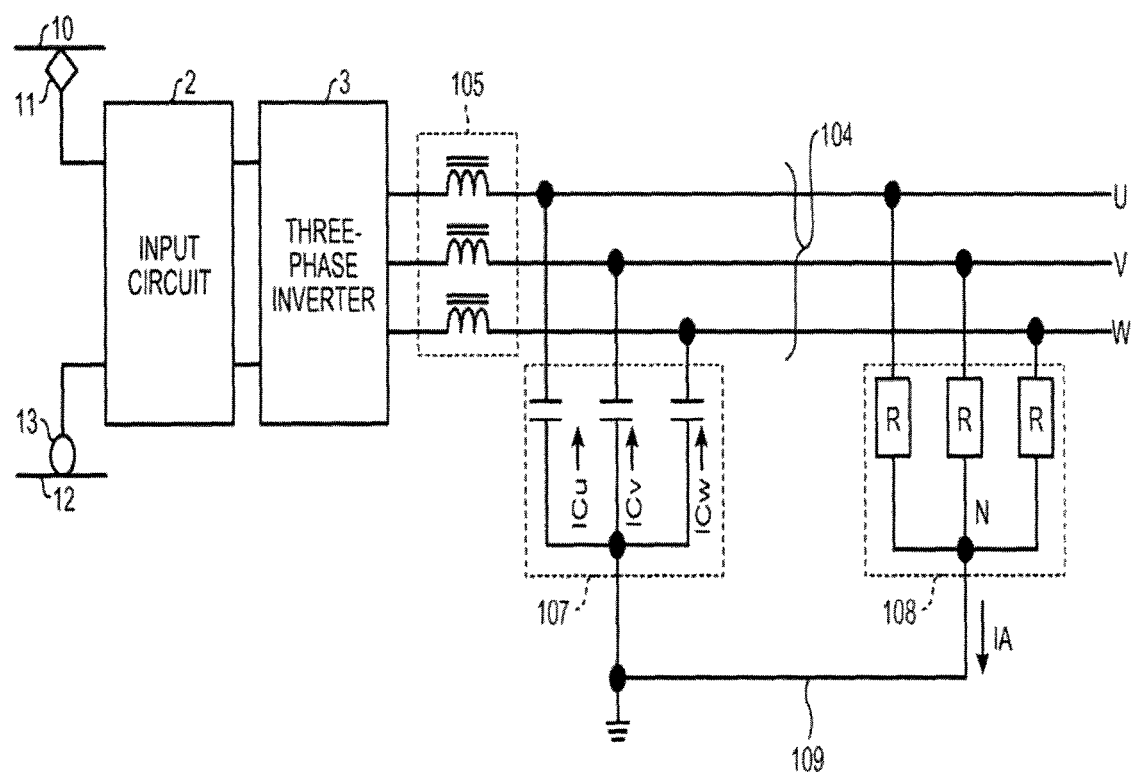
FIG. 2 depicts a general connection structure according to a conventional technique in a case where a three-phase inverter is connected to a single-phase load.

FIG. 2 depicts a general connection structure according to a conventional technique in a case where a three-phase inverter is connected to a single-phase load. As described in Patent Literature 1 mentioned above, a configuration shown in FIG. 2, in which the filter reactor 105 is connected to an output side of the three-phase inverter 3 and a Y-connection filter capacitor 107 in which a neutral point is grounded is connected to an output side of the filter reactor 105, is a general configuration of an auxiliary power source device for a vehicle. When a single-phase load 108 is connected to an auxiliary power source device for a vehicle with this configuration, one end sides are connected to respective phases of three-phase output lines 104, and other end sides are connected to each other and grounded at a ground potential via a connecting wire 109. Note that the single-phase load 108 is grounded to fix the potential of one end of the single-phase load 108 at a ground potential. By fixing the potential of the one end of the single-phase load 108, designing of insulation and pressure resistance of the single-phase load 108 itself becomes very simple.

In this example, in the auxiliary power source device for a vehicle configured as shown in FIG. 2, a case of carrying an unbalanced current in the single-phase load 108 is assumed. As shown in FIG. 2, the unbalanced current is carried in the connecting wire 109 as a total single-phase load current IA. Meanwhile, in the configuration of FIG. 2, as for currents carried in respective capacitors of the filter capacitor 107 that performs neutral grounding, phases of these currents are different from each other, and thus single-phase load currents (respective phase currents between U and N, V and N, and W and N) are carried in the filter capacitor 107 that performs neutral grounding. That is, a current ICu that is carried in a capacitor connected to a U-phase (hereinafter, "U-phase capacitor", the same abbreviation also applies to capacitors of other phases) is equal to a single-phase-load U-phase current, a current ICv that is carried in a V-phase capacitor is equal to a single-phase-load V-phase current, and a current ICw that is carried in a W-phase capacitor is equal to a single-phase-load W-phase current.

In this manner, according to the configuration of the conventional technique, as also described in the section of "Solution to Problem", in a filter capacitor that has a grounding function of an output stage, a property that is greater than the current capacity originally required for a filtering function is required, and this requirement leads to cost increase and size increase of the filter capacitor.

Figure 3:
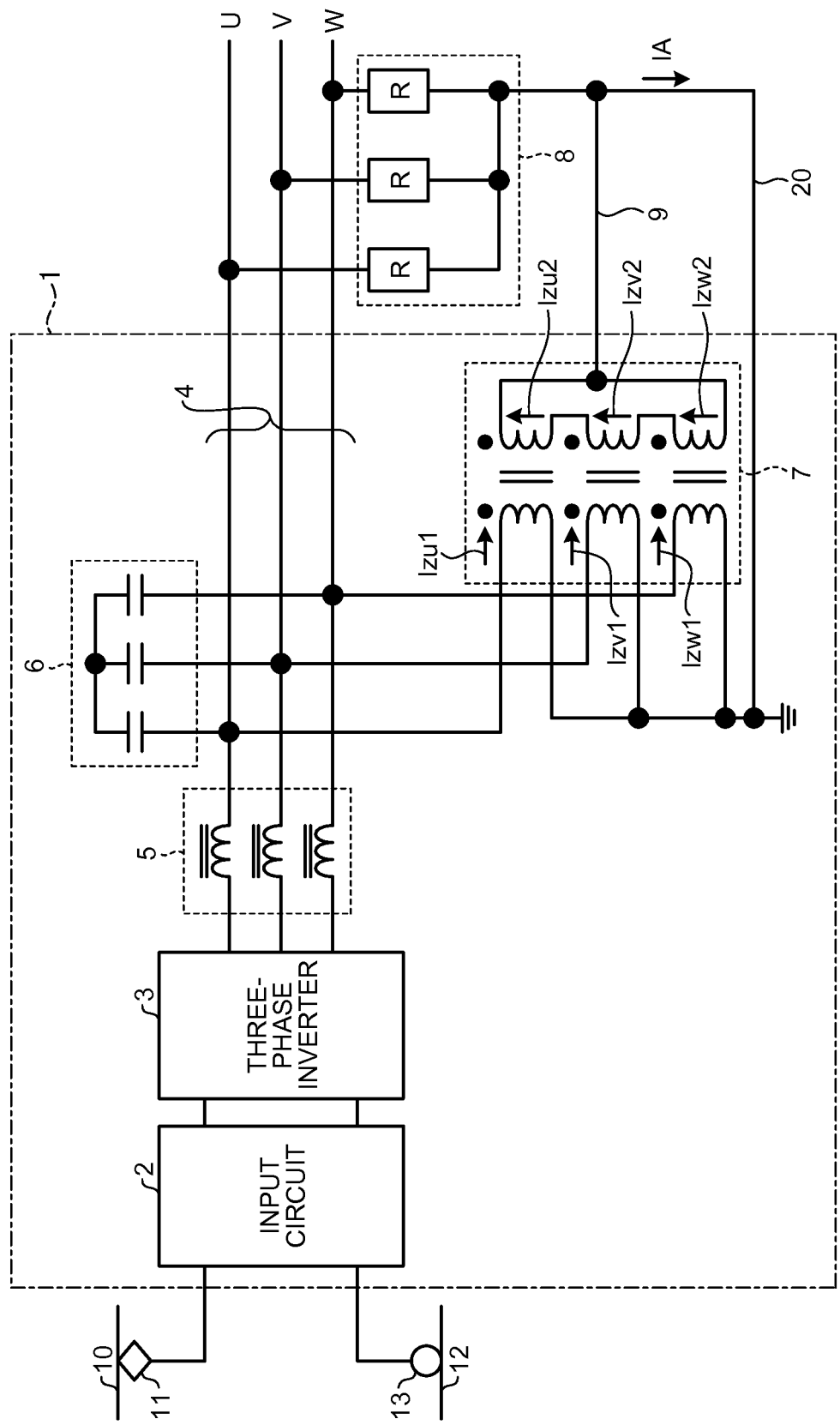
FIG. 3 is an explanatory diagram of operations of the auxiliary power source device for a vehicle according to the embodiment.

FIG. 3 is an explanatory diagram of operations of the auxiliary power source device for a vehicle according to the present embodiment, and depicts currents and voltages necessary for explaining the operations as these elements are added on the configuration diagram of FIG. 1. In FIG. 3, similarly to the case of FIG. 2, the total single-phase load current IA as an unbalanced current is carried in a connecting wire 20. However, as in the present embodiment, when the three-phase transformer 7 of Y-delta connection is arranged as a circuit unit that has a grounding function of an output stage, currents Izu2, Izv2, and Izw2 carried in the respective secondary windings of the delta-connected three-phase transformer 7 are closed within the connection. Accordingly, all of the currents Izu2, Izv2, and Izw2 become the same current with the same phase. As a result, all of currents Izu1, Izv1, and Izw1 carried in the respective primary windings on the Y-connected primary side also become the same current with the same phase. Therefore, only a current with an amount corresponding to the total single-phase load current IA is carried in the three-phase transformer 7 that has a grounding function of an output stage. As a result, the remainder of the single-phase load current is carried in a main circuit, that is, in the three-phase output lines 4. As for the currents Izu1, Izv1, and Izw1 carried in the respective primary windings on the Y-connected primary side, the amount of these currents becomes one third of the total single-phase load current IA as influences due to errors and the like in manufacturing are eliminated.

As is obvious from the above explanations of operations, as for the current capacity of the three-phase transformer 7, it is only necessary to provide a capacity that matches an assumed amount of an unbalanced current, and therefore, as compared to conventional techniques, downsizing and cost reduction can be achieved.

In the configuration of FIG. 1 (or of FIG. 3), as the single-phase load 8, a load connected to all phases (respective phases of U, V, and W) has been exemplified; however, the single-phase load 8 can be a single-phase load that is connected to only one or two of these phases.

Figure 4:
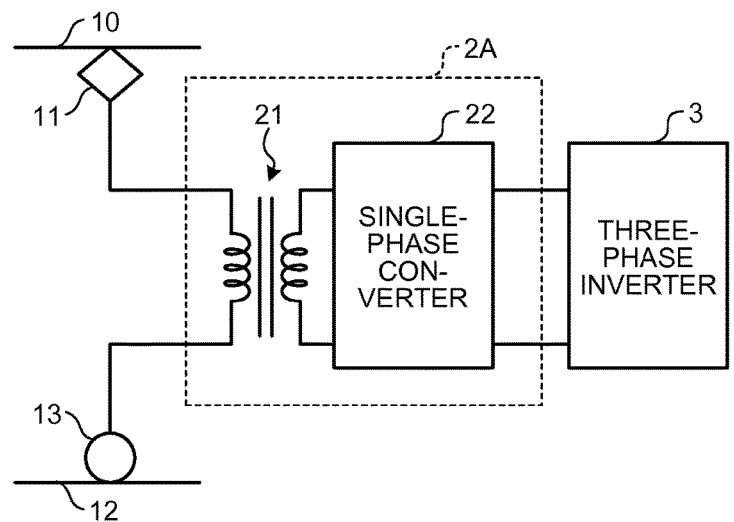
FIG. 4 is an example of a variation of an input circuit (a case of an AC overhead wire).
Figure 5:
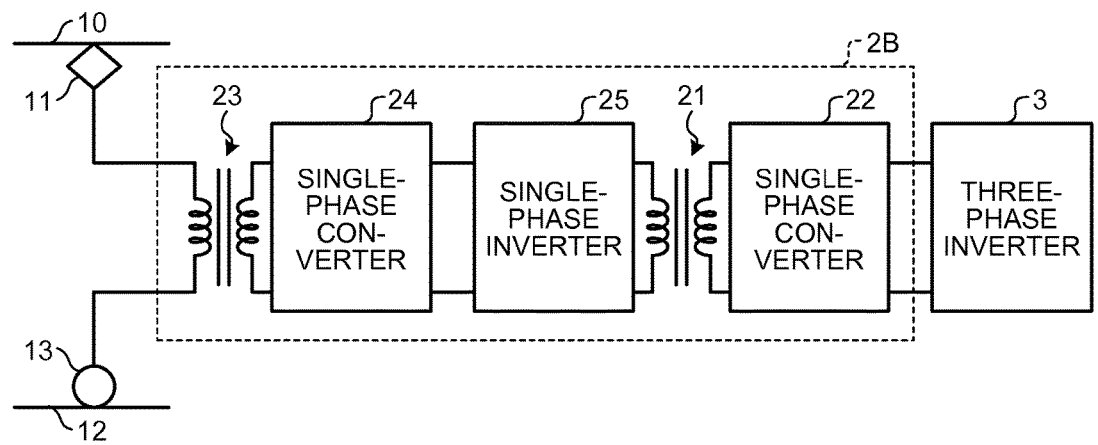
FIG. 5 is an example of a variation of the input circuit that is different from the example of FIG. 4 (a case of an AC overhead wire).
Figure 6:
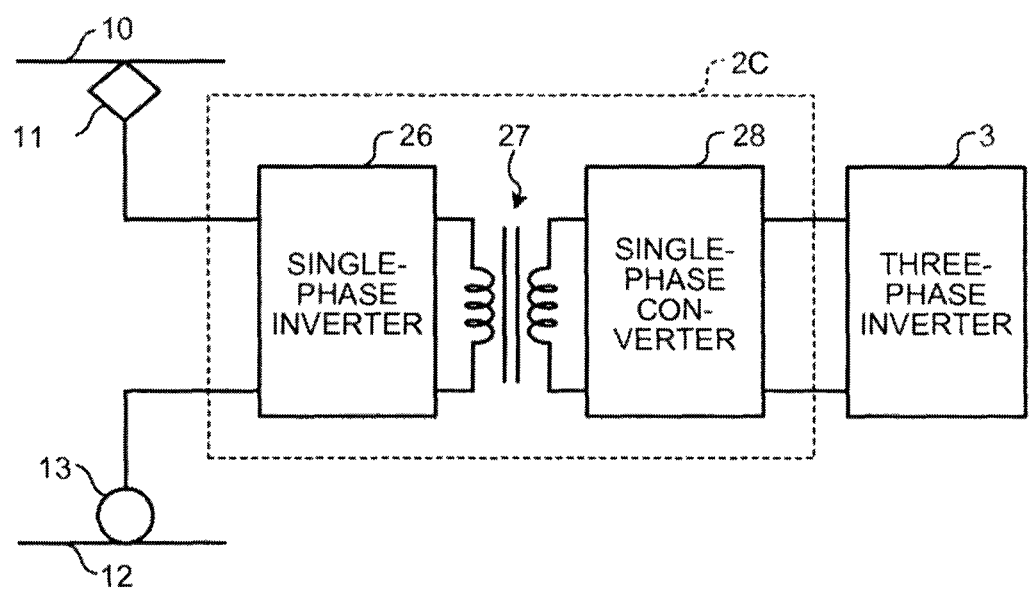
FIG. 6 is an example of a variation of the input circuit that is different from the examples of FIGS. 4 and 5 (a case of a direct current (DC) overhead wire).

FIGS. 4 to 6 are explanatory diagrams of a variation of the input circuit 2, where FIGS. 4 and 5 are examples of a case of an AC overhead wire, and FIG. 6 is an example of a case of a DC overhead wire.

In the case of an AC overhead wire, as shown in FIG. 4 as an example, an input circuit 2A can be configured by a transformer 21 and a single-phase converter 22. Further, when the voltage of the AC overhead wire is high, as shown in FIG. 5 as an example, as an input circuit 2B is configured by providing a transformer 23, a single-phase converter 24, and a single-phase inverter 25 in a front stage of the transformer 21, the voltage can be stepped down in a stepwise manner by the two single-phase converters 22 and 24. In the case of a DC overhead wire, as shown in FIG. 6 as an example, an input circuit 2C can be configured by a single-phase inverter 26, a transformer 27, and a single-phase converter 28.

While configurations of providing single-phase converters are shown in FIGS. 4 to 6, it is also possible to have a configuration in which rectification circuits are used instead of these single-phase converters.

As explained above, in the auxiliary power source device for a vehicle according to the present embodiment, there is provided a filter reactor that is connected to respective output terminals of a three-phase inverter, a filter capacitor that is connected in a Y-shape at an end on a load side of the filter reactor and a neutral point is not grounded, and a three-phase transformer including primary windings that are connected in a Y-shape at the end on the load side of the filter reactor and a neutral point is grounded and secondary windings that are connected in a delta shape. Therefore, even when a single-phase load is connected as a load, it is possible to obtain an effect that a filter capacitor having a filtering function is not imposed to have a property that is greater than the current capacity originally required for a filter function.

In the configurations described above, it is possible to stabilize the potential of secondary windings as long as any one of connection terminals between secondary windings connected in a delta shape is grounded.

INDUSTRIAL APPLICABILITY

As described above, the present invention is useful as an auxiliary power source device for a vehicle that does not impose, on a filter capacitor having a filtering function, a property that is greater than the current capacity originally required for a filter function.

REFERENCE SIGNS LIST

1 auxiliary power source device for vehicle
2, 2A, 2B, 2C input circuit
3 three-phase inverter
4 three-phase output line
5 filter reactor
6 filter capacitor
7 three-phase transformer
7a1 to 7a3 primary winding
7b1 to 7b3 secondary winding
8 single-phase load
9, 20 connecting wire
10 overhead wire
11 power collector
12 rail
13 wheel
21, 23, 27 transformer
22, 24, 28 single-phase converter
25, 26 single-phase inverter

The invention claimed is:
1. An auxiliary power source device for a vehicle incorporated in an electric vehicle, the auxiliary power source device comprising:
a three-phase inverter that converts an input DC voltage into a desired three-phase AC voltage and applies the three-phase AC voltage to one end side of a load;
a filter reactor that is connected to respective output terminals of the three-phase inverter;
a filter capacitor that is connected in a Y-shape at an end on a load side of the filter reactor and is not grounded at a neutral point; and
a three-phase transformer that includes primary windings that are connected in a Y-shape at the end on the load side of the filter reactor and grounded at a neutral point and secondary windings that are connected in a delta shape, wherein the neutral point of the primary windings is connected to an opposite end side of the load, and the secondary windings are connected to the neutral point of the primary windings via a connecting wire.
2. The auxiliary power source device for a vehicle according to claim 1, wherein any one of connection terminals between the secondary windings connected in the delta shape is grounded.
3. The auxiliary power source device for a vehicle according to claim 1, wherein AC power from an AC overhead wire is supplied to the electric vehicle.
4. The auxiliary power source device for a vehicle according to claim 1, wherein DC power from a DC overhead wire is supplied to the electric vehicle.
5. The auxiliary power source device for a vehicle according to claim 1, wherein the connecting wire is continuous between the secondary windings and the neutral point of the primary windings.

6. The auxiliary power source device for a vehicle according to claim 1, wherein the secondary windings are directly connected to the neutral point of the primary windings via the connecting wire.

7. The auxiliary power source device for a vehicle according to claim 1, wherein the filter reactor is directly connected to the load.

* * * * *